United States Patent

Weinberg

[11] 3,733,138
[45] May 15, 1973

[54] OPTICAL SYSTEM FOR INSPECTION OF A CAVITY

[75] Inventor: Mark H. Weinberg, Short Hills, N.J.

[73] Assignee: The United States of America as represented by the Secretary of the Army, Washington, D.C.

[22] Filed: June 14, 1972

[21] Appl. No.: 262,900

[52] U.S. Cl. .................................................356/241
[51] Int. Cl. ...............................................G01n 21/16
[58] Field of Search ....................356/241; 350/11

[56] References Cited

UNITED STATES PATENTS

| | | | |
|---|---|---|---|
| 3,413,067 | 11/1968 | Froio | 356/241 |
| 3,610,763 | 10/1971 | Mathews | 356/241 |
| 3,680,966 | 8/1972 | Cofek et al. | 356/241 |
| 3,690,775 | 9/1972 | Cousins | 356/241 |

Primary Examiner—William L. Sikes
Attorney—Harry M. Saragovitz, et al.

[57] ABSTRACT

An optical system for inspecting a 360° annular section of a housing interior. The optical system includes a telescope whose objective lens end is axially aligned and slidably affixed to a hollow cylindrical extension tube, a hollow cylindrical bellows has one end fixedly attached to the objective lens end and the other end slidably attached to the housing so that it is axially aligned with the extension tube and the housing, a light transmitting means extends longitudinally through said extension tube and bellows so that its output end protrudes into the housing interior, a 360° reflecting means is axially disposed adjacent to the light means output end, a 360° viewing means is axially positioned adjacent to the reflecting means so that the viewing means field of view coincides with the reflecting means field of illumination, a light source is directed into the input end of a fiber optic light pipe for illuminating a 360° area of the housing interior so that the latter may be viewed by focusing the telescope on an image formed by the viewing means reflecting surface, and the entire interior surface visually scanned by longitudinally moving the housing relative to the viewing means.

4 Claims, 3 Drawing Figures

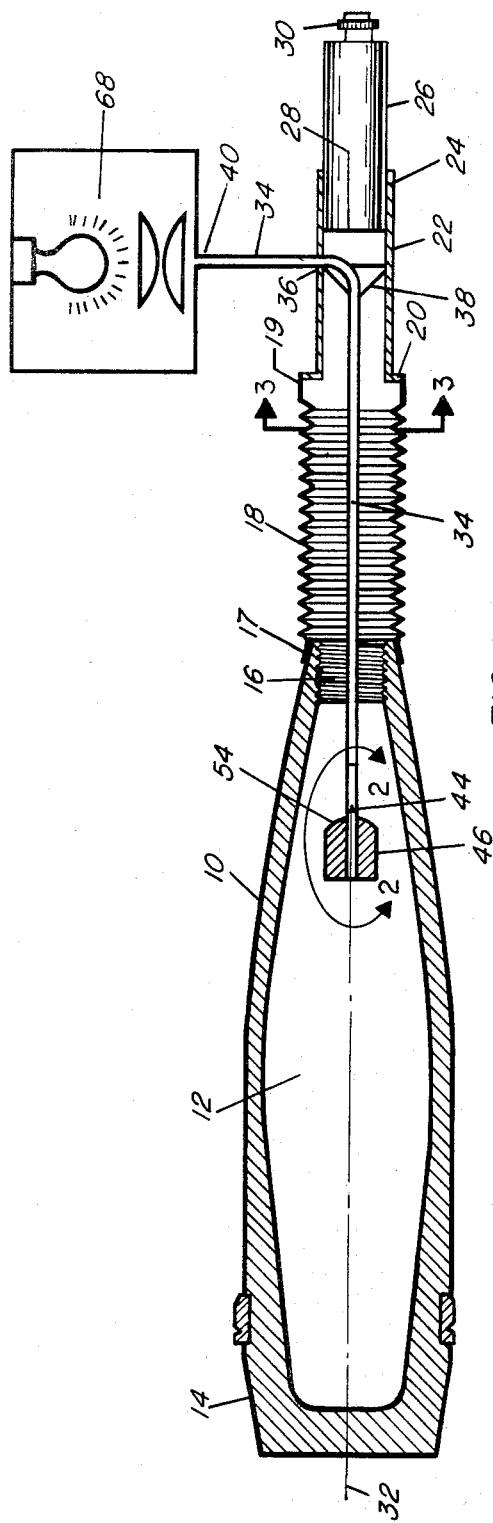
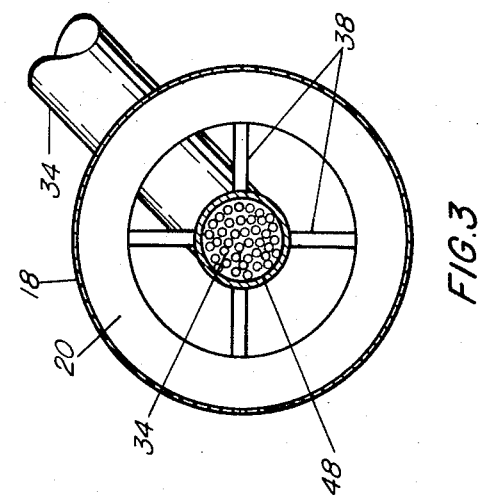
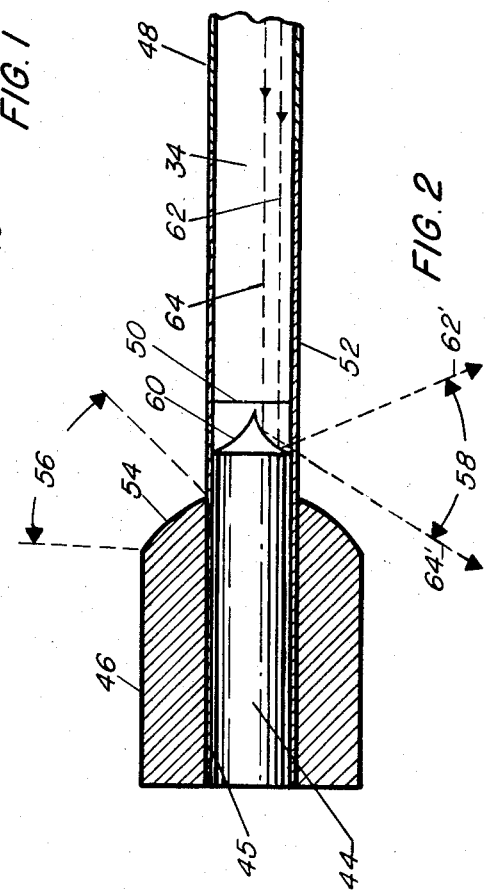
FIG. 1
FIG. 3
FIG. 2

3,733,138

OPTICAL SYSTEM FOR INSPECTION OF A CAVITY

GOVERNMENT INTEREST

The invention described herein may be manufactured, used and licensed by or for the Government for governmental purposes without the payment to me of any royalty thereon.

BACKGROUND OF THE INVENTION

Various means have been used in the prior art to make visual inspection of hollow housings in order to determine their soundness of structure. In the manufacture of shell casings, it is not only of utmost importance to inspect for fissures which might subsequently cause a malfunction during launch, endangering the launching crew, but also important to detect for explosive material in shell areas that should be free of such materials. For example, in the case of shaped charge artillery projectiles, the presence of any explosive material in the forward cavity of such projectile would constitute a critical defect because of the potentiality for a premature detonation during the launch phase. Some of the prior art devices used to solve this internal housing inspection problem includes the use of a borescope or a coherent fiber optic bundle having a mirror or prism operatively affixed to the inserted end for sidewise looking at the internal wall of the structure. The problem with the aforementioned devices is that they permit viewing of only a very small area at one time. In order to view the entire interior these instruments generally require slow longitudinal scanning of the inspected piece while the piece is being rotated. Such prior art devices are time consuming to use and highly fatiguing to the operator because of the necessity of continuously observing a limited moving field of view that is spirally being traced by the conventional borescope. The moving field observed by the inspector in such devices not only contributes to early eye fatigue, but also adds to the psychological tension of the inspector because of his awareness that he cannot look away for a moment without permitting a portion of the interior surface to go uninspected.

SUMMARY OF THE INVENTION

The present invention relates to an optical system for viewing a full 360° annular area on the inside of a cavity. The present invention provides an improved capability over the prior art to visually inspect the interior of a housing. The present device helps an inspector scan hidden interior surfaces not visible to his unaided eye in a more normal manner. For example, using the present device the inspector may by viewing the interior at a given location along the axis of the cavity see the wall surface as if he were not using an instrument. The inspector can by simple longitudinal motion of the viewing instrument, relative to the cavity, rapidly inspect the interior surface without rotating the part being inspected. The design of the present device permits a brilliant light source to be used to illuminate either a broad or narrow band of wall surface.

In accordance with the present invention, light is introduced into the cavity to be inspected from a high powered source via a light pipe. The light is directed through the light pipe, operatively positioned at one end of the light pipe, to a 360° illuminator which in turn reflects the light from its mirrored first surface to the interior of the housing. The reflected exit angle generates a 360° band of light which can be broadened or narrowed by changing the curvature of the illuminator surface. A telescope is axially aligned with the light pipe and a reflecting viewing surface axially positioned proximate to the illuminator. The angular field of view can be varied by changing the curvature of the viewer surface. The light pipe is operatively held in the instrument within a hollow cylindrical steel tube. The tube is held in cantilever fashion by radially positioned support struts which are in turn attached to a hollow cylindrical telescope extension housing. The extension holds therein the objective end of the telescope. The telescope has a magnifying power capable of focusing on the image formed by the curved reflecting surface of the viewer. An opaque cylindrical bellows has one end attached to the open end of the telescope extension, and is axially positioned with respect to the light pipe contained therein. The other end of the bellows is fitted over the workpiece being inspected so that extraneous light is excluded therefrom. The presence of extraneous light tends to reduce the contrast in the image being viewed.

One of the objects of this invention is to provide an optical system for inspecting the interior of an artillery projectile.

Another object of this invention is to provide an optical cavity inspection tool which permits the inspector to view a 360° section of the interior wall without moving his eye nor rotating the piece being inspected.

Another object of this invention is to permit an inspector to view the interior of a housing without looking at a continuously moving field of view such as traced by a conventional borescope.

Another object of this invention is to provide a safe means for viewing the interior of a loaded projectile by having the light source external to the housing being inspected.

A further object of this invention is to provide an optical inspection device for viewing the interior of a housing with minimum of eye fatigue and mental strain normally associated with the use of a borescope.

For a better understanding of the present invention, together with other and further objects, reference is made to the following description taken in connection with the accompanying drawings.

BRIEF DESCRIPTION OF THE DRAWINGS

FIG. 1 is a partial cross-sectional and schematic view of the optical system; the cross section is taken through the longitudinal axis of the optical system and the projectile attached thereto.

FIG. 2 is an enlarged cross-sectional view taken along line 2—2 as illustrated in FIG. 1 showing the details of the viewer, illuminator, fiber-optic light pipe and tubes for holding the fiber-optic light pipe.

FIG. 3 is an enlarged cross-sectional view taken along line 3—3 as illustrated in FIG. 1 showing the constructional relationship of the bellows, telescope extension, struts and light pipe.

Throughout the following description like reference numerals are used to denote like parts in the drawings.

DESCRIPTION OF The PREFERRED EMBODIMENTS

The present invention is concerned with an optical inspection system which permits the internal inspection of a projectile cavity without rotating the part being inspected while permitting a 360° view. In its broader aspects the invention is intended to permit the internal inspection of small housings which have relatively inaccessible cavities and which cannot be illuminated and viewed readily from the outside.

Referring now to FIG. 1, a projectile envelope 10 has a cavity 12, a closed end 14 and an open rear end 16. Axially attached to the projectile open end 16 is a bellows open end 17 of an opaque cylindrical bellows member 18. The other end 19 of the bellows 18 is attached to the flanged end 20 of a hollow cylindrical telescope extension tube 22 which is axially aligned with the bellows 18. The open end 24 of the telescope tube 22 is slidably engages a telescope 26 about its objective end 28 and axially aligns the eye piece 30 so that it is concentric with the longitudinal system axis 32. The telescope 26 is any high quality instrument with magnifying power having capability to be focused on the image formed by the reflecting surface 54. A fiber-optic light pipe 34 passes through the telescope extension tube 22 at point 36 and is axially positioned to follow the longitudinal axis 32 toward the cavity 12. Four radially positioned struts 38 as shown in FIG. 3 help hold the light pipe 34 suspended in cantilever fashion from the telescope extension tube 22. A light source 68 has its light beam directed into the input end 40 of the aforementioned light pipe 34 to an axially positioned illuminator 44 whose surface reflects the beam radially outward toward the cavity 12 in a 360° annular band. A cylindrically shaped viewer 46 is operatively disposed on the longitudinal axis 32 forward of the illuminator 44.

FIG. 2 shows an enlarged cross-sectional view of the illuminator 44, steel tube 48, transparent tube 52, light pipe 34 and the viewer 46. The light pipe optic bundle 34 is encased in a steel supporting tube 48 almost to its terminal light output end 50. A hollow transparent tube 52 abuts the steel tube 48 near the output end 50 at point 51. The transparent tube 52 covers the illuminator 44, the light pipe 34 and is fixedly held within an axial viewer bore 45 of the viewer 46. The viewer 46 has a reflecting surface 54 whose field of view 56 coincides with the exit field of illumination 58 generated by the mirrored illuminator curved surface 60. The dotted lines 62 and 64 represent two light beams being transmitted by the light pipe 34 and their deflected beams 62' and 64' as dotted lines, respectively. The exit field of illumination 58 can be readily broadened or narrowed by changing the curvature of the illuminator surface 60. Similarly the angular field of view of the reflecting surface 54, as seen by the viewing personnel through the eye piece 30, may be varied by changing the curvature of the reflecting surface 54.

FIG. 3 shows an enlarged cross-sectional view taken through line 3—3 looking in the direction of the telescope objective lens end 28. The view shows the circular concentric configuration of the light pipe 34, the steel tube 48, the telescope extension tube flange end 20, the bellows 18 and the radial position of the struts 38 holding the light pipe 34 axial with respect to the telescope tube 22. The fiber-optic light source pipe 34 is shown radially joining the light pipe 40 posterior to the struts 38.

In operation, the item to be inspected is placed in position. The bellows open end 17 is positioned over the projectile open end 16. The light source 68 is switched on. The telescope 26 is focused on the image formed by the reflecting surface of the interior wall of the projectile 10 or material adjacent thereto sought to be viewed. The projectile 10 is translated in a direction along the longitudinal axis 32 relative to the viewer 46 thereby allowing the inspector to visually scan the entire interior surface of interest. After the bellows 18 has been compressed to its fullest extent the projectile 10 is removed and the viewer 46 is returned to its initial position with the bellows 18 extended.

I wish it to be understood that I do not desire to be limited to the exact method and detail of construction described for obvious modifications will occur to persons skilled in the art.

What is claimed is:

1. An optical system for inspecting a 360° annular sector within a housing which comprises:
   a telescope having an eye piece end and an objective lens end;
   a hollow cylindrical extension tube axially aligned and slidably affixed to said objective end;
   a hollow cylindrical bellows having one end fixedly attached to said objective end and another end slidably attached to said housing, and axially aligned with said extension tube and said housing;
   a light transmitting means having a supported light input end and a cantilever supported output end axially held in said extension tube, extending longitudinally through said extension tube and bellows so that said output end protrudes into said housing interior;
   a 360° reflecting means axially disposed immediately adjacent to said light means output end;
   a 360° viewing means having a reflecting surface axially positioned adjacent to said reflecting means so that said viewing means field of view coincides with said reflecting means field of illumination; and
   a light source operatively affixed to said light transmitting means input end for illuminating a full 360° area of said housing interior so that said interior may be viewed by focusing said telescope on an image formed by said viewing means reflecting surface, and scanned by longitudinal movement of the housing relative to the viewing means, thereby allowing visual scanning of the entire interior surface of said housing being inspected.

2. An optical system as recited in claim 1 wherein the light transmitting means comprises:
   a fiber-optic light pipe;
   a hollow steel tube partially covering said light pipe along its longitudinal length leaving said light pipe uncovered at said output end;
   a hollow transparent tube covering said uncovered output end and enclosing therein said reflecting means so that it is operatively positioned immediately adjacent to said output end.

3. An optical system as recited in claim 2 wherein the reflecting means comprises:
   a rod having a highly reflective curved conically shaped surface on one end axially disposed adjacent to said light pipe output end.

4. An optical system as recited in claim 3 wherein the viewing means comprises:
   a cylindrically shaped member having an axial bore therein for fixedly holding said member attached to said transparent tube; and
   an annularly curved reflecting surface axially disposed on one end of said member adjacent to said reflecting means.

* * * * *